May 18, 1965 V. A. WILLOUGHBY 3,184,581

SYSTEM FOR CO-ORDINATING SYNCHRONIZING SIGNALS

Filed April 3, 1961 5 Sheets-Sheet 1

INVENTOR.
VICTOR A. WILLOUGHBY
BY R. Frank Smith
Lloyd F. Seebach
ATTORNEY & AGENT

SYSTEM FOR CO-ORDINATING SYNCHRONIZING SIGNALS

Filed April 3, 1961 5 Sheets-Sheet 2

INVENTOR.
VICTOR A. WILLOUGHBY
BY R. Frank Smith
Lloyd F. Seebach
ATTORNEY & AGENT May 18, 1965 V. A. WILLOUGHBY 3,184,581

SYSTEM FOR CO-ORDINATING SYNCHRONIZING SIGNALS

Filed April 3, 1961 5 Sheets-Sheet 3

INVENTOR.
VICTOR A. WILLOUGHBY

BY R. Frank Smith
Lloyd F. Seebach
ATTORNEY & AGENT

May 18, 1965 V. A. WILLOUGHBY 3,184,581

SYSTEM FOR CO-ORDINATING SYNCHRONIZING SIGNALS

Filed April 3, 1961 5 Sheets-Sheet 4

*INVENTOR.*
VICTOR A. WILLOUGHBY

*BY* R. Frank Smith
Lloyd F. Seebach
ATTORNEY & AGENT

May 18, 1965 V. A. WILLOUGHBY 3,184,581

SYSTEM FOR CO-ORDINATING SYNCHRONIZING SIGNALS

Filed April 3, 1961 5 Sheets-Sheet 5

INVENTOR.
VICTOR A. WILLOUGHBY

BY R. Frank Smith
Lloyd F. Seebach
ATTORNEY & AGENT

United States Patent Office 3,184,581
Patented May 18, 1965

3,184,581
SYSTEM FOR CO-ORDINATING SYNCHRONIZING SIGNALS

Victor A. Willoughby, Rochester, N.Y., assignor to Eastman Kodak Company, Rochester, N.Y., a corporation of New Jersey Filed Apr. 3, 1961, Ser. No. 100,144
8 Claims. (Cl. 235—61.11)

Figure 1:
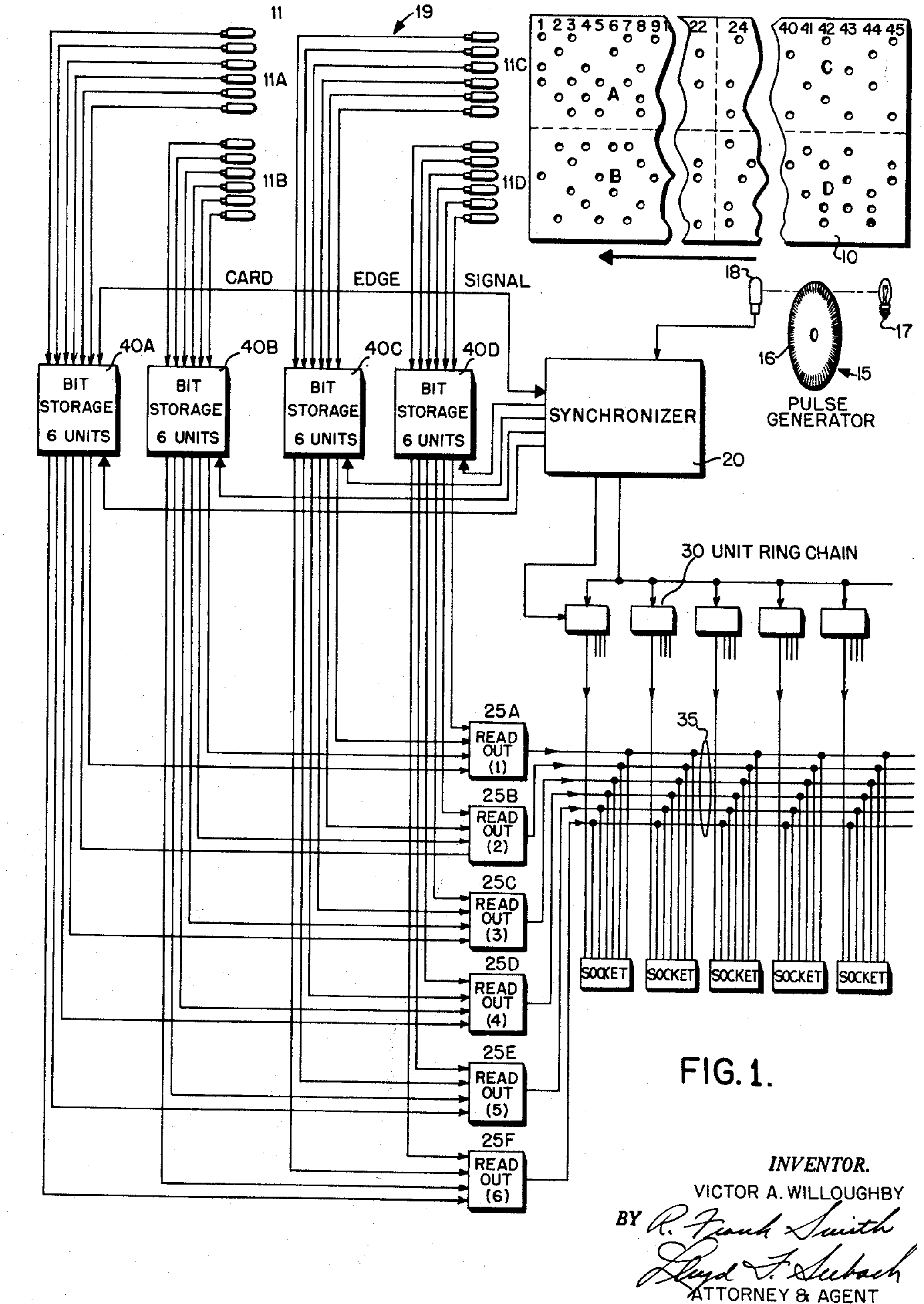

The present invention relates to a synchronizing device and more particularly to such a device for insuring proper relationship of synchronizing signals to the signals derived from encoded information on a medium.

In U.S. Patent 2,899,498, issued to R. G. Thompson et al. on August 11, 1959, there is disclosed a device for synthesizing facsimile signals from coded signals. In this apparatus punched cards are fed successively into and through a scanning station wherein the card passes between a light source and a photosensitive device to derive signals from the apertures in the card corresponding to the characters encoded in the card. The signals derived from the card are applied to a signal distribution system upon coincidence of the derived signals with a signal derived from a pulse generator, both of which are applied to an amplifying and gating circuit for distribution. Such a system requires that the cards be fed in exact alignment and in exact spaced relationship to each other in order that the signals derived from a column of code on the card are in coincidence with the pulse generated signal. Further, this system requires that the mechanical parts for feeding the cards be maintained in proper and exact conditions in order to obtain the proper synchronization.

In the apparatus disclosed in the present application, a pulse generator is provided which produces a number of pulses increased by a predetermined factor over the number of columns of code in an area or field of the card or information-bearing medium. In the embodiment disclosed and described hereinafter, this factor is chosen as 5 which thereby provides a series of five pulses by means of suitable circuitry between each column of code on the card. This group of generated pulses is continuous and periodic. As in the above-mentioned patent, the card is fed through a sensing station and one of the photosensitive devices for deriving signals from the encoded information is also utilized to obtain a signal from the leading edge of the card. This signal serves to condition circuitry which selects one of the pulses being supplied by the pulse generator as the initial pulse for synchronization with the signals derived from the columns of code. When the card edge signal selects one of the signals from the pulse generator as the initial signal, a ring counter is then triggered or stepped by each succeeding signal from the pulse generator so as to produce five pulses between each column of code. In a manner to be described more completely hereinafter, the signal derived from the columns of code are temporarily stored and successively released by each one of the counter output pulses occurring before the next code column is read. Upon read-out from this temporary storage, the signals are then applied in accordance with the distribution system to the proper memory storage for read-out in proper timed relation to the read-in for actuating the printer as disclosed in the above-mentioned patent. Since a definite relation exists between the leading edge of a card and the first column of code and any one of the five signals normally occurring between each column of code can be selected as the signal for starting synchronization, it can be readily understood that the relationship between successive cards need not be maintained with the accuracy required by the arrangement disclosed in the above patent. By the synchronizing device described in more detail hereinafter, it will also be readily understood that such a synchronizing device possesses many advantages over the prior art in that the accuracy required in the feeding structure as well as its maintenance is greatly reduced.

The primary object of the invention, therefore, is to provide a device for insuring proper relationship of synchronizing signals with the signals derived from information encoded in a medium.

Another object of the invention is to provide a synchronizing device which is initiated by the leading edge of a card or a control mark or designation which precedes the information when it is encoded on a continuous strip.

Still another object of the invention is to provide a pulse generating device which supplies continuous synchronizing signals to a circuit which is controlled to accept such signals only when conditioned by a signal derived from the edge of a card or from a control mark preceding the information on a continuous strip.

Other objects and advantages will be apparent to those skilled in the art by the specific embodiment of the invention described hereinafter.

Figure 2A:
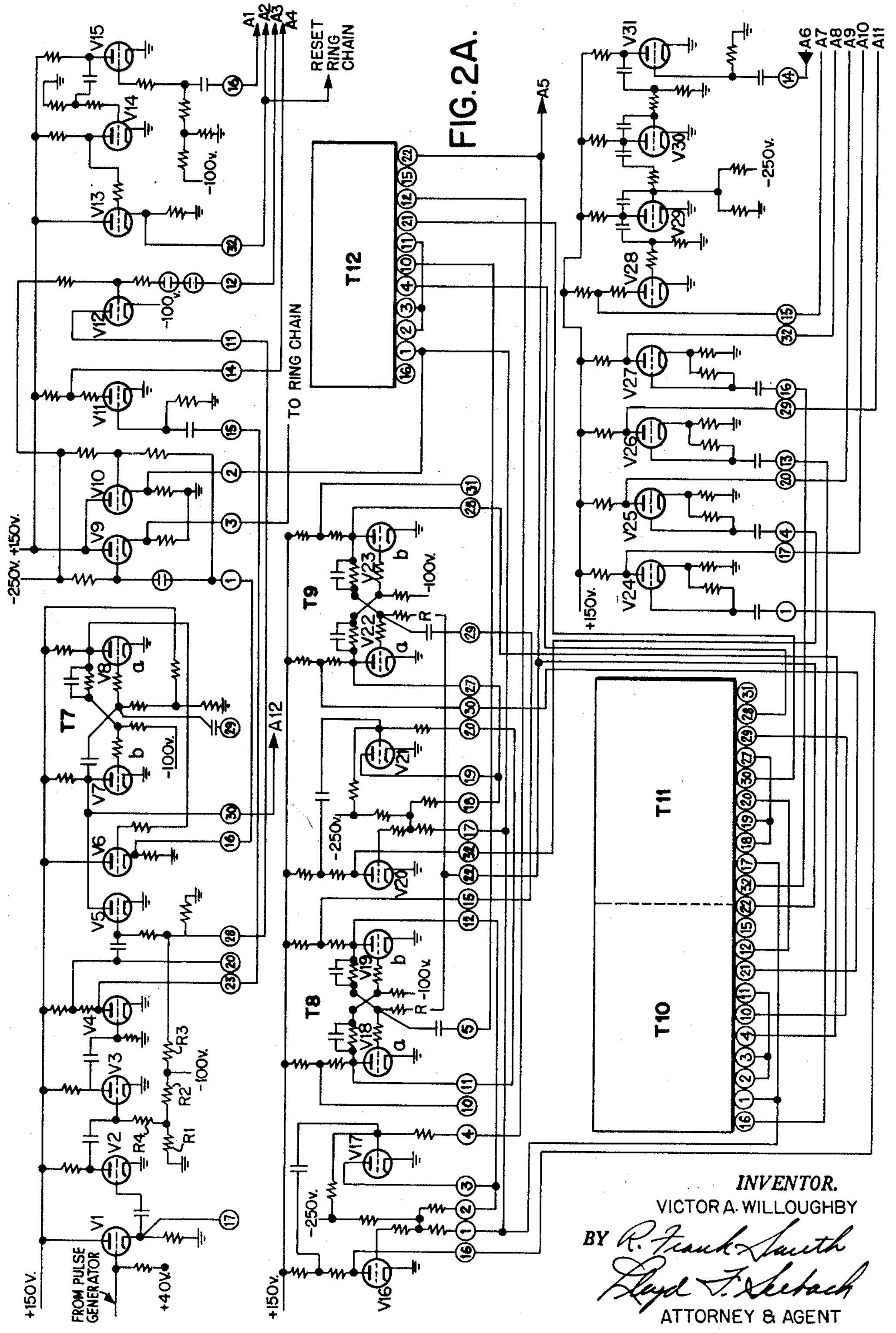
Figure 2B:
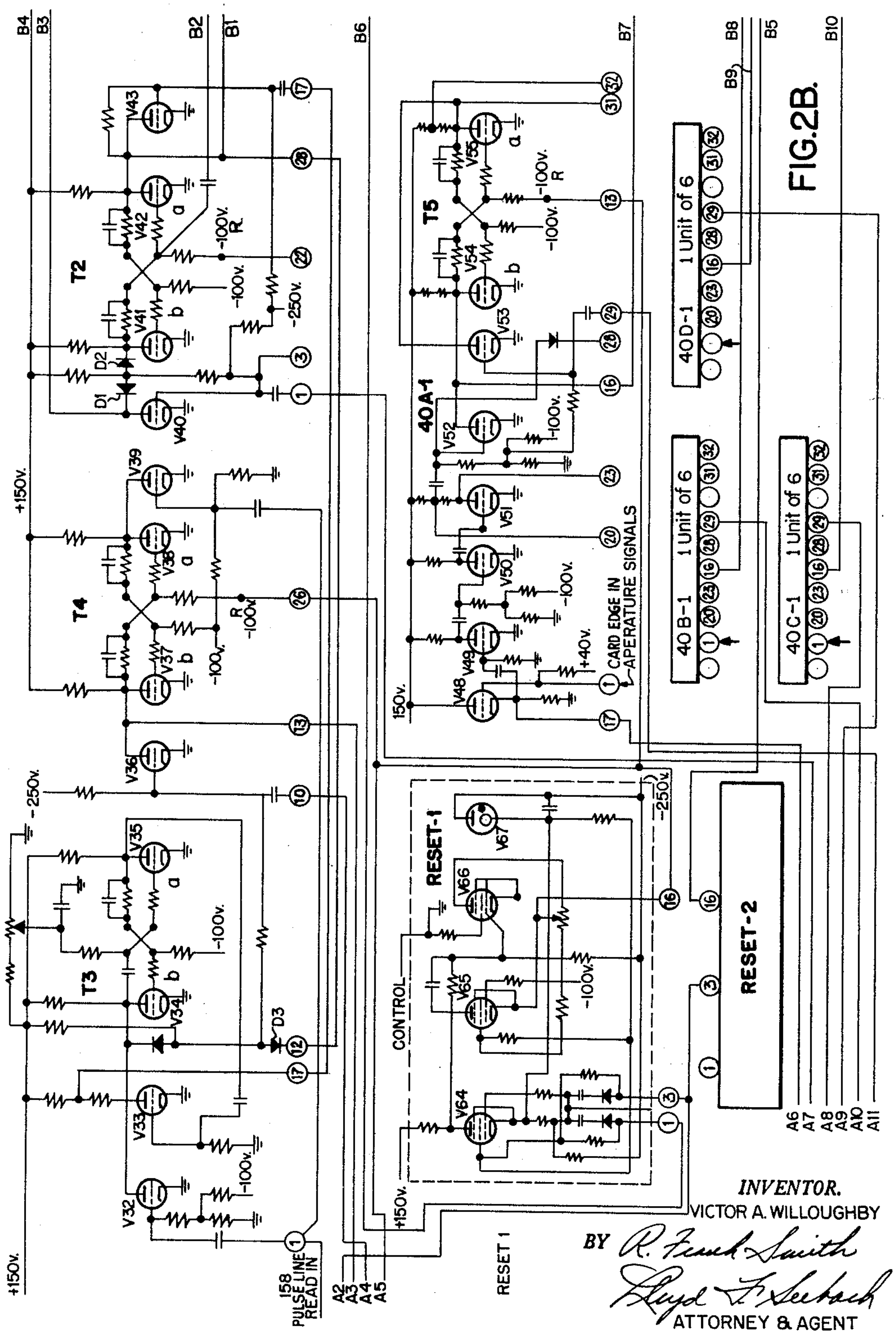
Figure 2C:
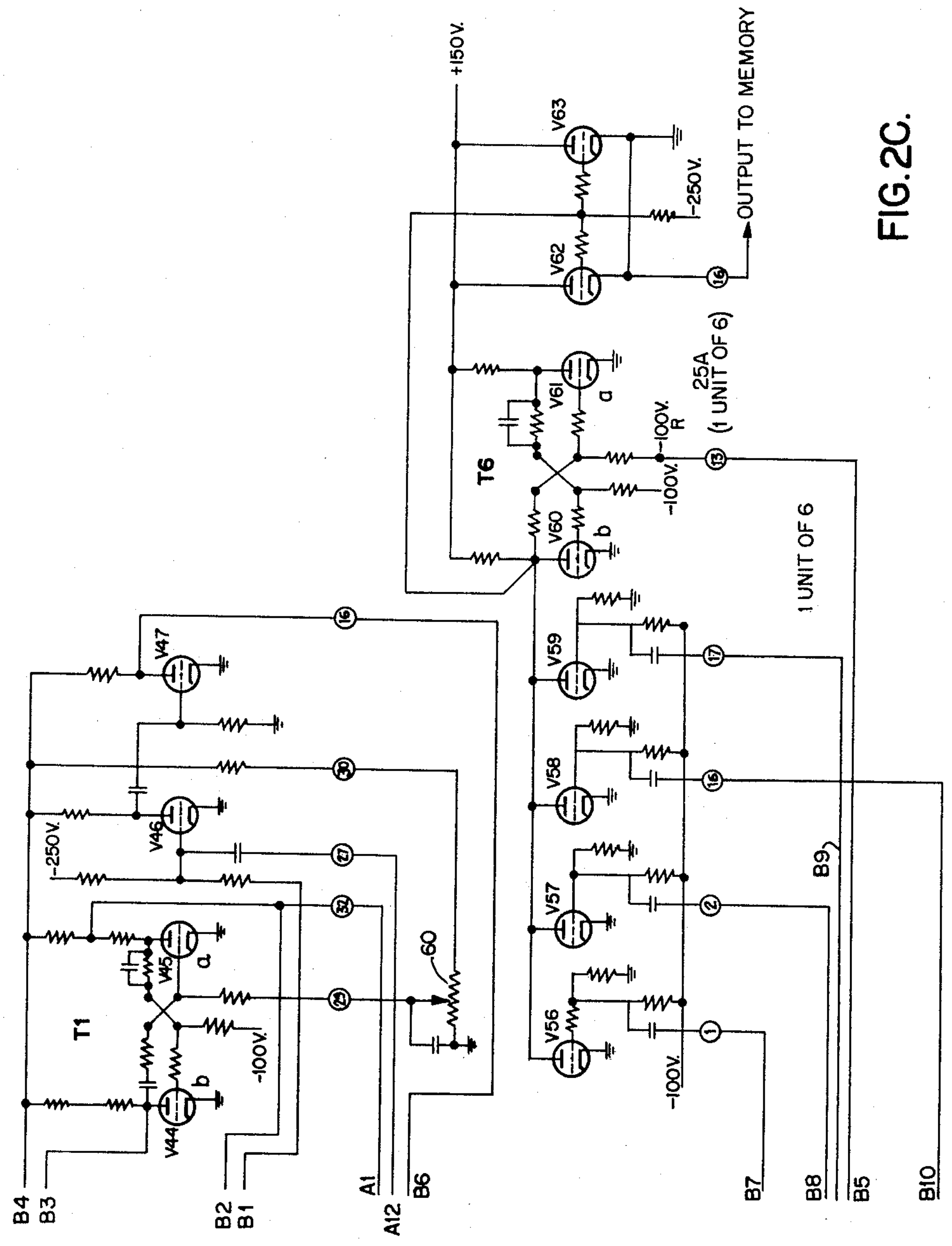
Figure 3:
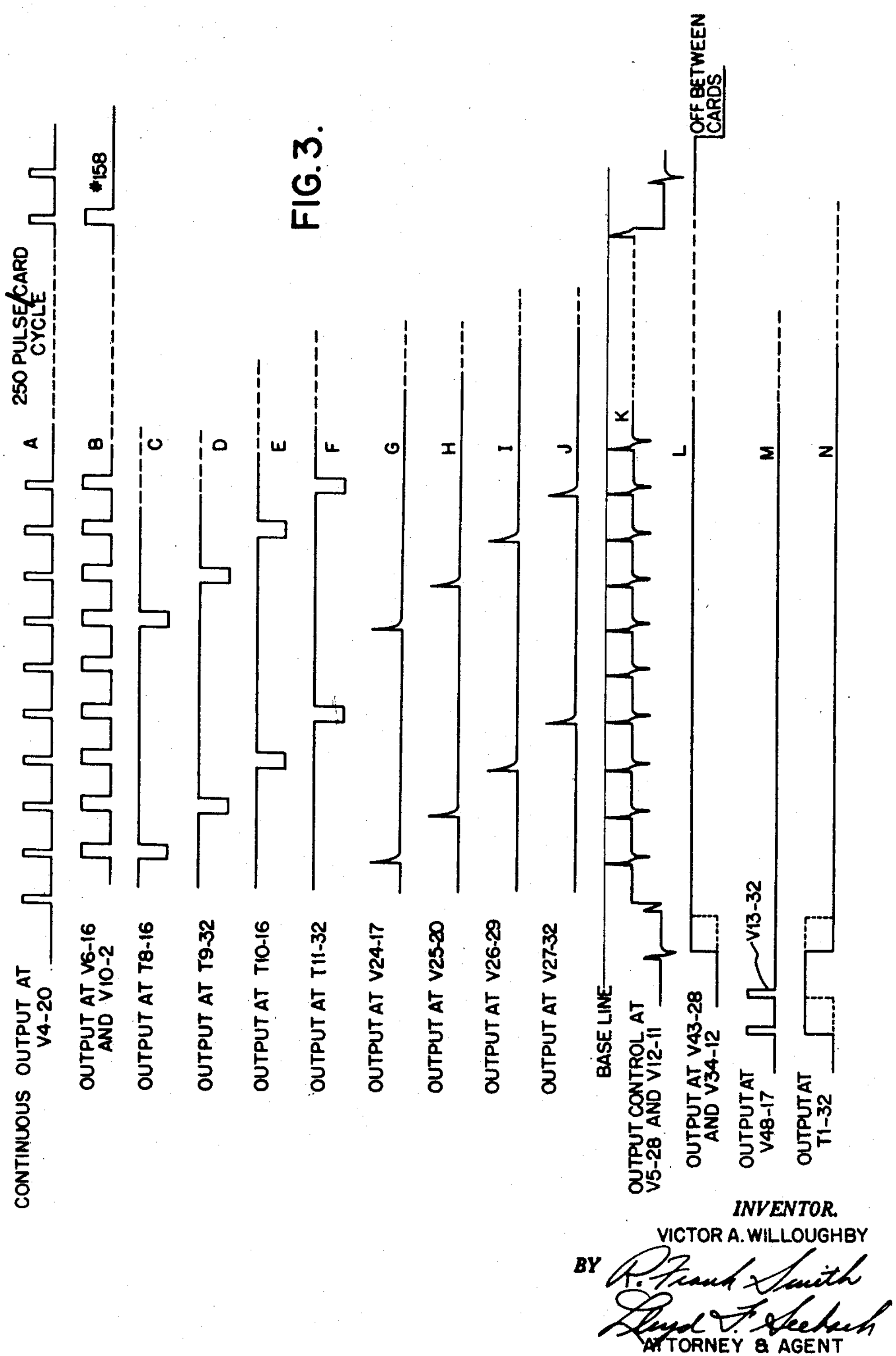

Reference is now made to the accompanying drawings wherein like reference numerals and letters designate like parts and wherein:

FIG. 1 is a block diagram showing the relationship of the synchronizing circuit to the storage and read-out system for distributing the signals derived from a punched card to a memory storage;

FIGS. 2A, 2B, and 2C are sections of a continuous schematic representation of the circuits disclosed in the blocks in FIG. 1; and FIG. 3 is a time relationship diagram of the output pulses of the various circuits shown in FIGS. 2A, 2B, and 2C.

With reference to FIG. 1, card 10 is shown as a 45-column card divided into four fields designated by A, B, C and D. Since a binary code is utilized and six bits comprise a character, the fields of the card are arranged both longitudinally and transversely thereof. As a result, each field is capable of having 22 characters encoded therein. It is to be understood, of course, that the binary code referred to herein is such that both alpha and numeric characters can be designated by a combination of the six possible code positions.

As is well known in the art and shown in the above-mentioned U.S. patent, the card 10 is moved continuously from a stack by any suitable means, such as rollers or a continuous belt, into and through a sensing station 19 in which a group of photosensitive devices 11 are arranged over a plate having two spaced columns of apertures which are arranged transversely of the plate in accordance with the code positions in a column on the card, a light source and an optical system being arranged beneath each group of apertures in the plate. In the present disclosure, the photosensitive devices 11 are arranged in two sets, each set comprising two groups of six such photosensitive devices arranged transversely of the sensing station and being spaced from one another in a longitudinal direction by a distance corresponding to the distance between a predetermined number of code columns on the card so that each group of photosensitive devices reads a particular area or field of the card. As shown in FIG. 1, group 11A is concerned with reading the field A of card 10, the group 11B is concerned with reading the field B of card 10, and in a like manner, groups 11C and 11D are concerned with field C and D of card 10. The spacing between the groups of photosensitive devices in 11A and B with respect to those in groups 11C and D can be of any desired number of columns depending on whether additional information is to be read into the memory storage from a source other than the card. In the present invention, groups 11A and 11B are spaced from groups 11C and 11D by the distance equivalent to 16 columns of code.

As card 10 is moved between the light source and the photosensitive devices 11, signals are not derived therefrom until the leading edge of the card provides a signal which is derived from one of the photosensitive devices in group 11A. As shown in FIG. 1, a pulse generating system 15 comprises a slotted disk 16 which is driven in synchronism with the means for driving card 10 through the sensing station 19 and has a light source 17 and a photosensitive device 18 arranged on opposite sides of the disk, respectively, and in alignment with the slots therein. As is well known, the photosensitive device 18 will generate periodic pulses as each slot makes and breaks the light path, and this series of signals is transmitted to the synchronizer circuit designated by the numeral 20. The disk 16 is provided with a number of slots in accordance with the predetermined number of pulses to be used between successive code columns on the card and the number of code columns comprising a card cycle. In other words, if 5 pulses are to be required between code columns and 50 columns of code are to comprise a card cycle, then disk 16 should be provided with 250 slots. In effect, therefore, a single revolution of disk 16 is equivalent to the movement of 50 columns on card 10 past one of the sets of the photosensitive devices 11. As will be described more fully hereinafter, the signal derived from the card edge is applied to the synchronizer circuit 20 and conditions this circuit so it will accept any one of the periodic pulses so as to commence a card cycle in proper timed relation to the first groups of signals derived from the encoded information. The signals derived from the successive columns of code in each field on card 10 by means of the photosensitive devices 11, are transmitted into temporary storage devices which are then triggered by the successive pulses derived from the synchronizer 20. The signals in storage are released successively from each unit in parallel and applied to a read-out circuit for distribution to a memory storage not shown in FIG. 1 but disclosed in detail in the above-mentioned patent. The synchronizer circuit 20 also provides a series of pulses for stepping the ring chain 30 which provides the signal for read-in of the signals to the memory storage as disclosed in the above-mentioned patent.

With respect to FIG. 1, the storage devices 40A, 40B, 40C and 40D are representative of six units in each device. Each unit, therefore, is concerned only with a particular character in the column of code being scanned. While read-in to each of the unit occurs simultaneously, the temporary storage allows for any skew of card 10, which may be due to feeding or misalignment of the feeding means, or any irregularity in the encoding. However, once the signals are stored, the following four successive pulses which are derived from synchronizer 20 between scanning of two successive columns of code are applied successively to each unit to release the signals in storage and apply said signals to the respective read-out devices 25A–25F. It follows, therefore, that the signals read out of temporary storage and representative of a particular character are read successively from each storage unit in accordance with the triggering or releasing signal provided by synchronizer 20. It should be remembered that this read-out from temporary storage to the memory storage is accomplished between successive columns of code as they are moved through the sensing station and in this particular instance, a fifth triggering pulse is utilized to read in information derived from a fixed card to the memory storage as disclosed in the above U.S. patent.

With reference to FIG. 2A the series of gating pulses generated by the pulse generator 15, shown in FIG. 1 is applied to the grid of the cathode follower V1. The series of periodic pulses are applied from V1 to the amplifiers V2, V3 and V4 which are serially arranged and capacitor-coupled. However, due to the resistors R1, R2, R3, and R4, which are coupled to the plate of V2 and the grid of V3, the bias on V5 is of such a magnitude as to normally inhibit acceptance of these signals from V1–V4, V5 being held in this condition due to the fact that V12 is in a conducting state. While the signals from the pulse generator are continuously applied to cathode follower V1, these signals have no effect until they are accepted as a result of V12 being rendered non-conductive as described hereinafter.

Assuming that all of the circuits are in their normal condition, for example, the various trigger circuits designated by T1, T2, T3, etc., are conducting on the side designated "*a*." The signal derived from the edge of a card as it is moved through sensing station 19 is applied to the terminal 1 of V48 in FIG. 2B. While any one of the photosensitive devices in the group 11A may be connected to its respective unit in a similar manner and used as the card edge signal, in the present disclosure it is assumed that the uppermost photosensitive device in the group 11A is connected to this terminal of the unit 40A–1. The output from cathode follower V48 in 40A is taken from pin 17 thereof and applied to the pin 14 of amplifier V31. This signal renders V31 conducting and the output signal from the plate thereof is coupled through capacitors to V31, V29 and V28, for further amplification and shaping, the shaped output pulse being applied to pin 15 of V28. This output at pin 15 of V28 is applied to pin 1 of V40 and is used as the card edge signal.

The signal applied to the grid of V40 renders this tube conducting and the resultant signal from the plate of this tube is inverted by the diode D1 which, in turn, biases the grid of tube V40 to render the tube non-conducting and non-receptive to any further signals. This signal from the plate of V40 is applied to the monostable trigger device T1 which has a time constant which is adjustable by means of the pot 60 connected to the grid of tube V45 in this circuit. When T1 is triggered an output signal is derived at its plate which is taken out at pin 32 and applied to pin 16 of V15. This signal is shaped by the circuit comprising V15 and V14 and the output at the plate of V14 is connected to the grid of cathode follower V13 which provides an output pulse at pin 32 which is connected to pins 3 of reset circuits 61 and 62, one of which is shown in schematic form. The reset signals derived at pins 16 thereof are utilized to reset T4–T6 and T8–T12 for the start of a card cycle. The signal at pin 32 of V13 is also used to reset ring chain 30. This reset signal is utilized in the event any transient signals have triggered any of these trigger circuits as the card is moved under photosensitive devices 11B and 11C.

When T1 returns to its normally conducting "*a*" position, T2 is triggered to flip to the side wherein V41 is conducting and by means of diode D2, the grid of V40 is maintained at a negative voltage below cutoff, T2 being maintained in this condition through a card cycle. A control voltage is derived from the plate of V42 and is applied to pin 28 thereof which is connected to pin 12 of the trigger circuit T3. This voltage applied through the diode D3 and differentiated changes the grid bias of V36 to cause T4 to trigger so V37 is then connecting. This will occur, of course, only when a signal is applied to the pin 10 of V36. While the series of pulses from generator 15 is not accepted by V5 due to the bias on the grid of V5, the amplified and shaped series is taken out at pin 23 and applied to pin 15 of V11. This series of pulses is differentiated and shaped and renders tube V11 conducting with each pulse, the output from the plate being applied to pin 14 and connected to pin 10 of V36. A control voltage from the plate of V37 is carried out through pin 13 and applied to the pin 12 in the circuit of V12. This voltage is applied to two neon tubes connected in series to the grid of tube V12. The signal on pin 12 results in shifting the bias of V12 and renders the tube non-conducting. The plate of V12 is connected to pin 11 thereof and then to pin 28 of inverter V5. When V12 is switched to a non-conducting condition, the bias of tube V5 is shifted so as to allow passage of the pulses being derived from slotted disk 16 to be applied to V4.

The series of pulses from generator 15 is therefore amplified and shaped by V1, V2, V3 and V4, the bias on V5 being such as to now be rendered conductive by one of the pulses derived from V4. V5 inverts the signal from V4 and the resultant signal causes T7 to be triggered, the resultant signal driving cathode follower V6 and producing a signal at pin 16 thereof. T7 is a monostable trigger having a fixed time constant equivalent to one-fifth of the interval for movement of successive columns of code into position with respct to photosensitive devices 11, T7 being triggered by each output signal from V4. The signal at pin 16 of V6 is connected to pin 1 and thence to the grids of cathode followers V9 and V10 to produce signals at pins 3 and 2 thereof respectively. The signal at pin 3 is connected to ring chain 30 to step this chain with each column of code to effect read-in of the signals into the memory storage described in the above patent. The signal at pin 2 is connected to the ring or counter chain comprising trigger circuits T8–T12.

For reasons which will be evident, T8 is the only trigger circuit conditioned for receiving the signal at pin 1 from pin 2 of V10. This signal causes V16 to be rendered conductive so a signal is derived from its plate and taken out at pin 16 which is connected to pin 1 of amplifier V24. The resulting signal is taken out at pin 17 and applied to pin 29 of the unit 40B. As described hereinafter, this signal causes the respective trigger T5 to flip to its "*a*" position, if a signal is stored therein, and the resulting output signal at pin 16 is connected to pin 2 of V57, see FIG. 2C.

A signal is also taken from the plate of V16 and capacitor coupled to the grid of V17 which is held in a biased condition by T12 for receiving the first signal from V10. The output signal from V17 at pin 3 is connected to pin 12 of T8 and, when T8 switches, a control voltage is applied to pin 2 which reduces the bias on V16 to a point below cut-off to render this circuit non-receptive to further signals. With the switching of T8, a control voltage at pin 11 thereof is connected to pin 20 of V21 to shift the bias on V20. When the succeeding signal from pin 2 of V10 arrives only V20 is conditioned to receive this signal at pin 17. The output signal is taken from pin 32 and connected to pin 4 of V25 and the amplified signal at pin 20 is connected to the pins 29 of the units 40D. As in the case of the previous signal from V17, the signal taken from the plate V20 is capacitor coupled to the grid of V21 and the output at pin 19 is connected to pin 27 of T9 which results in T9 being switched. When this occurs, a control voltage at pin 18 of V20 maintains this tube below cut-off. The control voltage at pin 28 of T9 is connected to the pin 4 of the T10 unit which corresponds to the same pin in the T8 unit which is conditioned for the succeeding pulse or signal from pin 2 of V10. The circuit action for T10, T11, and T12 is the same as that described above so for each pulse from V10, a signal is derived successively from each of T8–T12 and these signals are utilized to release the stored signals in parallel from each of the units 40A–40D in any order, the order being determined by the manner in which the signals from T8–T11 are connected to 40A–40D. Four successive pulses, see C, D, E, and F in FIG. 3, as well as a fifth pulse, see G FIG. 3, are obtained from T8–T12 between each column of code on card 10.

It is to be understood that the time constants of the circuitry described thus far are such that the first signal released to V5 coincides with the positioning of the first columns of code under photosensitive devices 11A and 11B and the 16th columns of code under the photosensitive devices 11C and 11D. As noted in FIG. 1, each of circuits 40 comprise six units, one unit being associated with each code bit of a character. In FIG. 2B only one of these circuits associated with a single code bit is shown in complete circuit form. The remaining circuits are merely designated by blocks, one block being associated with each code bit. Again, it is to be understood that six of these units are associated with each field so that the number of circuits actually involved are 24. Each signal derived from an aperture designating a bit of a particular character is applied to pin 1 of V48, as shown in FIG. 2B. This signal is amplified and shaped by V48, V49, V50, V51 and V52 and an output from the plate of V52 is utilized to trigger T5 to temporarily store the bit in this circuit.

The signals from T8–T11 are applied to pins 29 of units 40A–40D in the desired order, it being understood, for example, that the signal from pin 16 in the T8 unit is applied to pin 1 of V24 and from pin 17 thereof is then applied to each of the six units comprising the unit 40B at pin 29. Any signals stored by the respective trigger circuits T5 in this group will then be released to the read-out circuits 25A–25F. Therefore, each bit signal in a group is amplified by one of the amplifiers V56–V59 and the output is utilized to trigger the respective T6 trigger circuit. With triggering of the T6 circuit, the change in state produces a signal which drives the cathode followers V62 and V63 which provide an output at pin 16 which is connected to its respective line in the group 35 shown in FIG. 1. Since each of the read-out circuits 25A–25F are connected to each of units 40A–40B, it is necessary, that the T6 trigger circuits be reset to their normal state between each of the signals derived from T8–T12. This reset signal is obtained in the following manner: The first pulse in each group of five pulses changes the state of T7, the other four having no effect as to T7. However, V5 is receptive to the continuous pulses derived from generator 15 and each output from V5 is taken out at pin 30 and applied as a continuous series of pulses during a card cycle to pin 27 of V46. Each of these signals is amplified and shaped by V46 and V47, the output being taken from pin 16 of V47 and connected to pin 1 of reset circuit 2. This continuous series of signals is applied to the pentode driver V64 which is interconnected with V65 to provide a reset signal at pin 16 which, in turn, is connected to each of the units 25A–25F at pin 13 to reset the T6 trigger circuits before the next signal is applied to the storage unit for releasing another set of stored signals for distribution. In each column cycle of operation the trigger circuits are reset five times, the fifth pulse or signal having no effect inasmuch as the signals released by this signal is utilized elsewhere.

When the fourth pulse from T11 releases the last of the stored signals derived from the columns moved past the photosensitive devices 11, a fifth signal is derived from T12 but, as noted above, this signal is used for another purpose. T12, therefore, holds V16 conditioned for the next pulse from pin 2 of V10. The action of the units T8–T12 is continuous so long as signals are derived from pin 16 of V6.

In view of the above description, it will be evident that the card edge signal initiates a card cycle and between each column of code which is scanned the signals derived from the encoded bits in each column are temporarily stored and released during the interval required for successive columns to be positioned in relation to the photosensitive devices, the stored signals being released by a group of successive signals in any order before occurrence of the scanning of the next code column. The read-out circuits 25A–25F are reset to a normal position after each of the successive release signals and the T4 trigger in the synchronizing circuit as well as the counter circuit comprising T8–T12 are reset with the end of a card cycle.

Inasmuch as a card cycle will comprise a number of sync signals in accordance with the number of characters to be allocated to a particular field and the two groups of photosensitive devices 11A, 11B and 11C, 11D are separated by 16 code columns, a card cycle will comprise a minimum of 30 code columns, that is, the number of columns from column 16 to column 45 plus the distance from column 45 to the end of the card. Since generator 15 provides 5 signals for the time interval between code columns, a count of 158 was chosen as an arbitrary number of pulses to comprise a card cycle, that is, 30 columns times 5 plus 8. This count is derived from ring chain 30, see FIG. 1, which is initiated by the first signal derived from V9. With the 158 signal from this ring chain counter, a signal is applied to pin 1 of V32. With conductance of V32, T3 is triggered to its normal condition. At the same time, the signal at pin 1 is applied to the grid of V39 to render this tube conducting, thereby causing T4 to revert to its normal state. When this occurs, the bias on V12 is shifted to again render this tube conducting. With V12 again conducting, the bias on V5 is reduced below cut-off and no further signals are accepted from V4, T7 being thereby returned to its normal state. With the occurrence of the signal derived from the leading edge of the next card, any circuits not in their normal condition are reset to such position for the initiating of another card cycle.

It follows, therefore, in summary, that the signal derived from the card edge initiates circuit means for accepting the pulses from the pulse generator 15 for stepping a counting chain to provide a series of pulses for successively releasing the temporarily stored signals derived from the cards. In this way, the signals representative of a character are released from storage in parallel, the four groups of character signals being released successively during the period each successive column of code on the card is moved under and into relation with the sensing or photosensitive means. As pointed out in the above U.S. patent, the fifth pulse can be utilized to read in information which is obtained from a fixed card and which is common to all of the cards in the group being sensed. Further, as pointed out in the above-mentioned patent, the distribution of the signals for each column of code can be stored in any desired manner, that is, the position of any character or group of characters encoded on the card will not necessarily determine the order of read-out from storage for the ultimate use to be made thereof, the order of read-out being determined by the order in which the memory plugs (not shown) are connected to the sockets.

The disclosure herein described relates to a punched card of the type adapted for binary-six coding of characters. However, its use is not to be limited to this particular type of card because it is equally adaptable to cards of the Holerith or IBM type in which a single column of code designates a single character and such column of code extends across the full width of the card. By utilizing a matrix to convert the IBM type of code to a binary-six code, the code representative of a character could be then applied to the temporary storage device in the same manner as described above. In this particular instance, the card edge signal would be derived in exactly the same way and utilized to step a similar ring counter of less or greater number. By the same token, the circuitry described hereinabove can be utilized in connection with information encoded on a magnetic tape wherein a control mark on the tape precedes and designates the beginning of a group of characters, the clock or timing pulses being generated either by marks on the tape or by a separate means such as the slotted disk shown and described herein.

Since it will be readily apparent to those skilled in the art that the synchronizing device disclosed and described herein is applicable to arrangements other than that shown and described, the invention is not to be limited to the specific embodiment disclosed but is of a scope as defined by the appended claims.

Having now particularly described my invention, what I desire to secure by Letters Patent of the United States and what I claim is:

1. In a device for synchronizing a number of successive groups of signals with timing pulses to initiate parallel read-out of each group of signals, said groups of signals being derived from information encoded in successive columns on an information-bearing medium having means for identifying each number of groups of signals, the combination comprising a sensing station, means for continuously moving said medium through said sensing station, means arranged in said sensing station for deriving a group of signals from each column of encoded information on said medium, means for continuously generating periodic timing pulses, a predetermined number of said timing pulses being generated for the internal required to move each successive column on said medium past said signal-deriving means, means responsive to each signal in a group of signals for storing its respective signal, means including a number of units in accordance with said predetermined number of timing pulses and responsive to a corresponding number of successive control pulses derived from said timing pulses for providing a corresponding number of successive output pulses, any one of said output pulses being applied to said storing means for simultaneously releasing the stored signals therefrom before receipt of the next group of signals, means responsive to a signal derived from said identifying means for providing a control signal, said control signal being delayed in accordance with the relation of said identifying means to the first column on said medium, and control means normally inhibiting said timing pulses and responsive to said control signal for being rendered receptive to said timing pulses for producing said control pulses.

2. A device in accordance with claim 1 including means responsive to said control signal for initiating a cycle of operation in accordance with the number of groups of signals and providing a signal for restoring said control means to its inhibiting condition.

3. A device in accordance with claim 1 wherein any one of the signal-driving means senses said identifying means on said medium to provide an initiating signal and including means responsive to said initiating signal for conditioning said control means for reception of said timing pulses.

4. A device in accordance with claim 1 including means responsive to said control signal for providing a second control signal derived with respect to said first-mentioned control signal, and means responsive to said second control signal for conditioning said storing means and said output pulse means for reception of each group of said signals and said control pulses.

5. In a device for synchronizing a number of successive groups of signals with timing pulses to initiate parallel read-out of each group of signals, said groups of signals being derived from information encoded in successive and substantially aligned columns in at least two parallel areas extending longitudinally of an information-bearing medium having means for identifying the beginning of each group of signals, the combination comprising a sensing station, means for continuously moving said medium through said sensing station, means arranged in said sensing station and with respect to each parallel area for deriving a group of signals from a column of encoded information in each area, means for continuously generating periodic timing pulses, a predetermined number of said timing pulses being generated for the interval required to move successive columns on said medium past said signal-deriving means, storage means for the signals derived from each area, each storage means including a storage element for each signal in a group of signals, a counter means including a number of units in accordance with the predetermined number of said timing pulses and responsive to a corresponding number of successive control pulses for providing a corresponding number of successive output pulses, said output pulses being applied to said storage means in any order for simultaneously releasing the stored signals in each storage means in parallel before receipt of the next group of signals, means for deriving a signal from said identifying means for providing a control signal, means responsive to said control signal for providing a second control signal delayed with respect to said first control signal in accordance with the relation of said identifying means to said first column on said medium, control means normally inhibiting said timing pulses and responsive to said control signal for being rendered receptive to said timing pulses to produce the control pulses for stepping said counter means, and means responsive to said second control signal for conditioning said storing means and said counter means for reception respectively of a group of signals and said control pulses.

6. A device in accordance with claim 5 and including means responsive to each of said output pulses from said counter means for conditioning said storage means and said counter means to receive respectively the next and successive groups of signals and said control pulse.

7. A device in accordance with claim 5 wherein said signal-deriving means is arranged in two spaced sets in said scanning station, the first set being arranged across said medium and comprising two groups for deriving signals from each area and the second set being arranged across said medium for deriving signals from each area and spaced from the first set in a direction opposed to the movement of said medium by a distance corresponding to a predetermined number of columns on said medium to effectively derive four groups of signals from said medium.

8. A device in accordance with claim 7 wherein a storage means is connected to each group of signal-deriving means and each of said output pulses is connected to one of said storage means to effect read-out of each group of stored signals in an order determined by said output pulses.

References Cited by the Examiner

UNITED STATES PATENTS

| | | | |
|---|---|---|---|
| 2,899,498 | 8/59 | Thompson et al. | 178—22 |
| 2,974,312 | 3/61 | Ridler | 340—174.1 |

MALCOLM A. MORRISON, *Primary Examiner.*

STEPHEN W. CAPELLI, *Examiner.*

UNITED STATES PATENT OFFICE
CERTIFICATE OF CORRECTION

Patent No. 3,184,581 May 18, 196

Victor A. Willoughby

It is hereby certified that error appears in the above numbered patent requiring correction and that the said Letters Patent should read as corrected below.

Column 8, line 9, for "internal" read -- interval --.

Signed and sealed this 12th day of October 1965.

(SEAL)
Attest:

ERNEST W. SWIDER
Attesting Officer

EDWARD J. BRENNER
Commissioner of Patents